United States Patent
Kim et al.

(10) Patent No.: US 7,924,461 B2
(45) Date of Patent: Apr. 12, 2011

(54) PRINTING METHOD BASED ON REMAINING COLOR TONER OR INK INFORMATION

(75) Inventors: Young-ju Kim, Suwon-si (KR); Don-Seon Lee, Yongin-si (KR); Bong-gi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1206 days.

(21) Appl. No.: 11/140,285

(22) Filed: May 31, 2005

(65) Prior Publication Data

US 2005/0264850 A1    Dec. 1, 2005

(30) Foreign Application Priority Data

May 31, 2004   (KR) .................. 10-2004-0039103
Jun. 21, 2004   (KR) .................. 10-2004-0046098

(51) Int. Cl.
*H04N 1/48*    (2006.01)
*H04N 1/52*    (2006.01)

(52) U.S. Cl. .................. 358/2.1; 358/534; 358/3.24

(58) Field of Classification Search .................. 358/538, 358/530, 500, 2.1, 534, 3.24; 347/7, 6, 5, 347/1, 41, 40, 20, 23, 22; 345/590, 589, 345/581, 418; 399/184, 183, 182, 177, 30; 382/164, 173, 174, 175, 176, 177, 178, 179, 382/180

See application file for complete search history.

(56) References Cited

U.S. PATENT DOCUMENTS

| | | | |
|---|---|---|---|
| 4,422,084 A * | 12/1983 | Saito | 347/7 |
| 5,016,096 A * | 5/1991 | Matsunawa et al. | 358/538 |
| 5,134,440 A * | 7/1992 | Nishimori | 399/184 |
| 6,108,009 A * | 8/2000 | Nishikawa | 345/590 |
| 6,142,600 A * | 11/2000 | Takahashi et al. | 347/23 |
| 6,430,711 B1 * | 8/2002 | Sekizawa | 714/47 |
| 6,612,685 B1 * | 9/2003 | Marra et al. | 347/41 |
| 6,621,590 B1 * | 9/2003 | Livingston | 358/1.15 |
| 6,827,415 B2 * | 12/2004 | Otokita et al. | 347/14 |
| 2005/0062987 A1 * | 3/2005 | Hashimoto et al. | 358/1.9 |

FOREIGN PATENT DOCUMENTS

| | | |
|---|---|---|
| JP | 2001293911 A * | 10/2001 |
| JP | 2002-165102 | 6/2002 |
| KR | 1999-015541 | 3/1999 |
| KR | 1999-18752 | 3/1999 |
| KR | 1999-34075 | 5/1999 |
| KR | 2003-013443 | 2/2003 |

* cited by examiner

*Primary Examiner* — Thomas D Lee
(74) *Attorney, Agent, or Firm* — Roylance, Abrams, Berdo & Goodman, LLP

(57) ABSTRACT

A method and apparatus for printing a document by remaining color toner or ink information is provided. The printing method comprising the steps of providing remaining color toner or ink information supported by the printing device; dividing the document into areas, and designating colors to the designated areas; and if the remaining amounts of colors are sufficient to print the document in the designated colors, printing the document in the designated colors

17 Claims, 10 Drawing Sheets

PRINTING METHOD BASED ON REMAINING COLOR TONER OR INK INFORMATION

CROSS-REFERENCE TO RELATED APPLICATIONS

This application claims the benefit under 35 U.S.C. §119(a) of Korean Patent Application Nos. 2004-39103 filed on May 31, 2004 and 2004-46098 filed on Jun. 21, 2004 in the Korean Intellectual Property Office, the entire contents of each being hereby incorporated by reference.

BACKGROUND OF THE INVENTION

1. Field of the Invention

The present invention relates in general to a method and apparatus for printing a document in designated colors with reference to remaining color toner or ink information. More specifically, the present invention relates to a method and apparatus for printing a document in designated colors through a driver or a printing device referring to the remaining color toner or ink information that a printing device supports.

2. Description of the Related Art

In general, to print a document stored in a data processing device through a printing device, a data processing device requires a driver for driving the printing device. A document in the printing process refers to an object including text, image and other types of objects to be printed by the printing device. When a print command is given for printing an object document that is prepared through an application program, the application program transmits to the driver the print command and the object document to be printed. The driver converts the print command and the object document to be printed to a data format recognizable to the printing device. The converted data is transferred to the printing device through an interface, and printed on a printing paper.

FIG. 1 illustrates a part of a printing process according to a prior art printing method. Referring to FIG. 1, a setup menu 10 is shown. In the case when a document to be printed contains images and text in color, a user has two options according to the prior art printing method. One is to print the entire document in color, and the other is to print the document in black and white. On the other hand, in case that a document to be printed contains color images and black and white text, a color cartridge is used to print the color image(s) and a black cartridge is used to print the black and white text. If the user chooses the black and white printing, the entire document is printed in black and white.

Therefore, even though a document contains different kinds of objects, it is impossible to change the (pre-designated) colors of those objects for printing. That is, the user has only two options left, either printing the document the way it was prepared through the application program (whatever colors there were), or printing the entire document in black and white.

If the user wants to change colors of the objects, he or she disadvantageously has to go back to the application program to produce the document in new colors.

Another problem is that in practice printers are not likely to use an equal amount of each color for every printing process. Some colors in the printing device may be more abundant than others. If certain colors in the printing device are exhausted, an object image or text to be printed cannot be expressed in many diverse colors. In such a case, even though only a part of the colors are used up, the entire cartridge should be replaced.

SUMMARY OF THE INVENTION

It is, therefore, an aspect of the present invention to provide a method and apparatus for printing using remaining color toner or ink information, in which a document to be printed is divided into areas, and colors are designated to the divided areas.

Another aspect of the present invention is to provide an apparatus and method for designating colors of a document to be printed when preparing to start a printing operation only, whereby a user can change colors of the document without having to go back to an application program where the document is originally prepared.

Still another aspect of the present invention is to provide an apparatus and method for designating colors for a document to be printed by referring to remaining color toner or ink information provided from a printing device.

Yet another aspect of the present invention is to provide an apparatus and method for changing colors of a document to be printed by executing a preview function provided by a driver user interface (UI).

To achieve the above aspects and advantages, there is provided a method for printing a document using remaining color toner or ink information in a printing device, the method comprising the steps of providing remaining color toner or ink information supported by the printing device; dividing the document into areas, and designating colors to the divided areas; and printing the document in the designated colors if the remaining amount of colors are sufficient to print the document in the designated colors.

Preferably, the color designating step is performed in a driver for use in driving the printing device. Also, in the color designating step, the document is divided into areas according to the objects in the divided area and the color is designated by using a touch screen or button of the printing device.

Preferably, the areas of the document are divided into objects, and colors (in color and/or black cartridges) are designated to each of the objects. Also, preferably the areas of the document are divided into a text, and an image, and at least one of the text and the image is designated in a desired color.

Preferably, the printing method of the present invention further comprises the steps of rendering the document; matching colors to the document in designated colors; and performing a half-tone process on the color matched document, wherein the color designating step divides the rendered document into areas and designates colors to the divided areas, and the color matching step matches the colors to the document according to the designated colors.

According to another embodiment of the printing method of the present invention further includes the steps of rendering the document; matching colors to the rendered document; and performing a half-tone process on the color matched document, wherein the color designating step divides the color matched document into areas and designating colors to the divided areas, and the color matching step performs the half-tone process on the color designated document.

According to another embodiment of the printing method of the present invention further comprising the steps of rendering the document; matching colors to the rendered document; and performing a half-tone process on the color matched document, and the color designating step divides the half-tone processed document into areas and designates colors to the divided areas.

According to still another embodiment of the printing method of the present invention further comprising the steps of rendering the document; matching colors to the rendered document; performing a half-tone process on the color matched document; and shingling the half-tone processed document, and the color designating step designates colors to the shingled areas. The term "shingling" is understood to be the process as disclosed in the article entitled, "HP DeskWriter C printer driver development—development of Macintosh driver for HP color ink-jet printer—Technical" by William J. Allen, Toni D. Courville, Steven O. Miller" that was published in Hewlett Packard Journal (August 1992), which is hereby incorporated by reference.

Another embodiment of the present invention provides a printing system comprising an application program for preparing a document; a driver for receiving remaining color toner or ink information regarding the colors supported by the printing system, and dividing the document into areas and designating colors to the areas referring to the remaining color toner or ink information; and a printing device for transmitting the remaining color toner or ink information regarding the colors supported by the printing system, and being driven by the driver for printing the document in the designated colors according to information received from the driver.

Preferably, the driver matches the color designated document to the designated colors, performs a half-tone process on the document, and renders the half-tone processed document.

Preferably, the driver renders the color designated document, matches the document to the designated colors, and performs a half-tone process on the document; and the printing device prints the half-tone processed document.

Another embodiment of a printing device of the present invention comprises a remaining color toner or ink information storage for storing information about the remaining toner or ink of colors that are supported by the printing system; and a communication part for transmitting the remaining color toner or ink information, whereby the printing device prints the document in designated colors that are selected by a user referring to the remaining color toner or ink information.

Preferably, the printing device further includes an external memory input part to which an external memory is input; a rendering part for rendering a document stored in the external memory; a color designating part for dividing the rendered document into areas, and designating colors to the areas divided; and a control part for comparing the remaining amounts of colors with the amount of remaining color in the color cartridges to be consumed for printing the document in the designated colors, and if the remaining amounts of colors are sufficient, controlling the printing device to print the document in the designated colors.

Preferably, the color designating part designates colors to the areas on the basis of a user's selection that is made referring to the remaining color toner or ink information.

Preferably, the color designating part divides the document into a color image, color text, black and white image, and black and white text, and designates a color a user selected to at least one of the color image, color text, black and white image, and black and white text.

If the amounts of colors to be consumed for a printing operation are greater than the remaining amount of colors, the control part controls the color designating part to change the designated colors.

Preferably, the control part employs a color counter to calculate the amount of color remaining in the color cartridges to be consumed for the printing operation.

Preferably, the printing device further comprises a display for displaying the document in the designated colors, wherein the control part edits the designated colors with reference to the document and the remaining color toner or ink information, and controls the printing device to print the document in the edited colors. In this case, the document is displayed on the display through a preview function.

According to another embodiment of a method for printing a document through a device driver comprises the steps of changing a color information of the document to be printed by executing a preview function of the device driver, and generating a command based on the changes made; and performing a printing operation based on the generated command.

Preferably, the command generating step comprises the sub-steps of displaying the document to be printed by executing the preview function of the device driver; if an object and a color on the displayed document to be printed are selected for change, storing the selected object and the color information that are subject to the change; and on the basis of the stored information about the object and the color to be changed, generating a command for the document to be printed.

Preferably, the preview function is executed to display information on residual colors that are supported from the printing device.

BRIEF DESCRIPTION OF THE DRAWINGS

The above aspects and features of the present invention will be more apparent by describing certain embodiments of the present invention with reference to the accompanying drawings, in which.

Throughout the drawings, it should be understood that like reference numerals refer to like features, structures and elements.

DETAILED DESCRIPTION OF EXEMPLARY EMBODIMENTS

Exemplary embodiments of the present invention will be described herein below with reference to the accompanying drawings. In the following description, well-known functions or constructions are omitted for the sake of clarity and conciseness.

Figure 1:
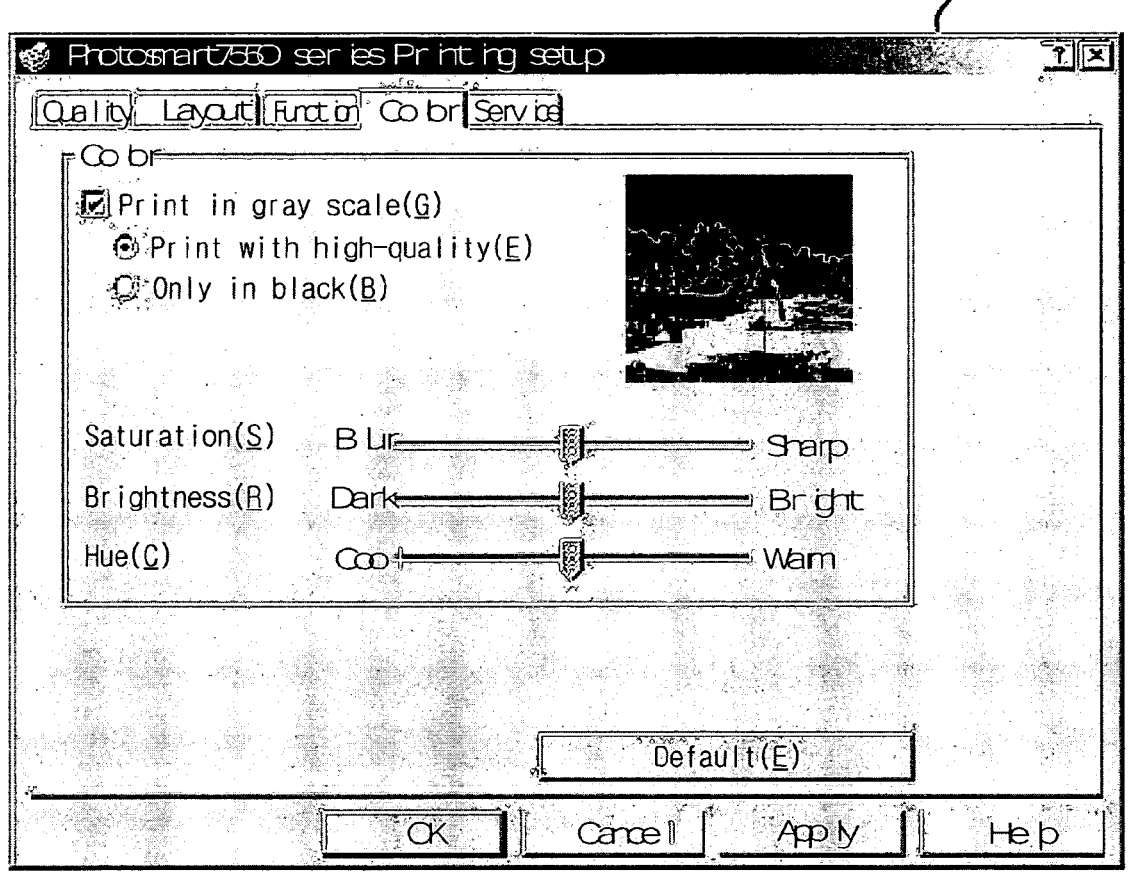
FIG. 1 illustrates a part of a printing process according to a conventional printing method.
Figure 2:
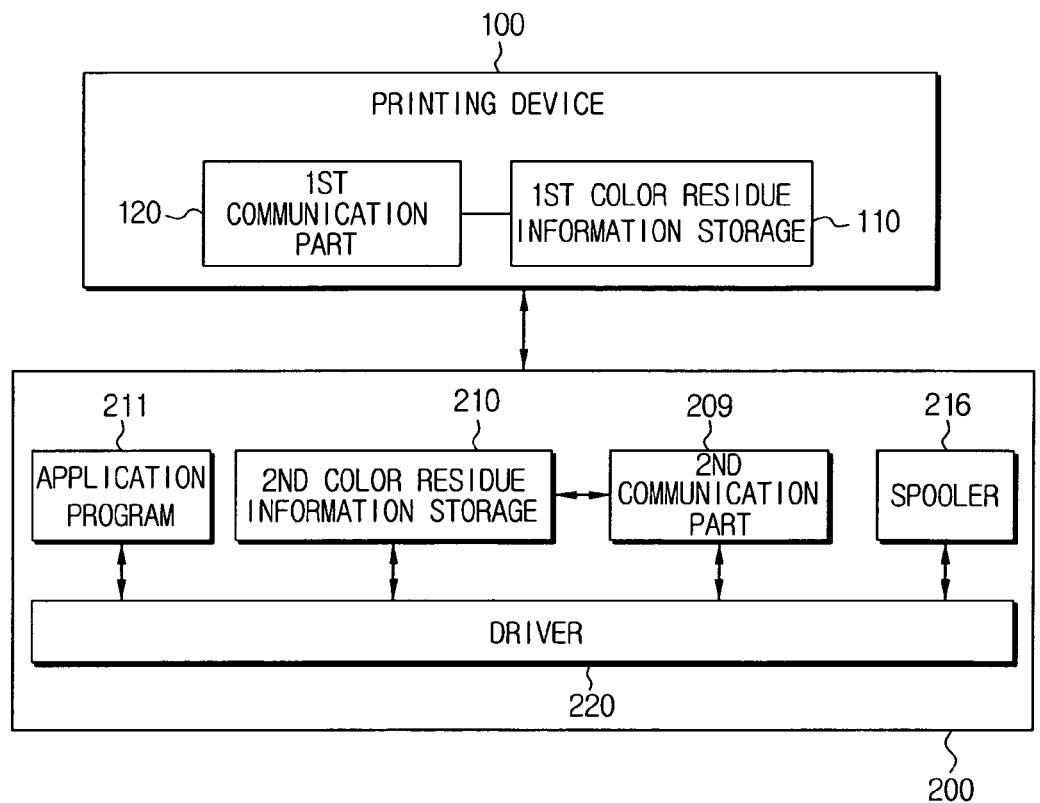
FIG. 2 is a block diagram of a printing system according to an embodiment of the present invention.

FIG. 2 is a block diagram of a printing system according to an embodiment of the present invention.

As shown in FIG. 2, the printing system comprises a data processing device 200 and a printing device 100. The data processing device 200 comprises an application program 211, a driver 220, a second color residue information storage 210, a spooler 216, and a second communication part 209.

A typical example of the data processing device 200 is a computer. The application program 211 enables a user to prepare a document to be printed. The document may include images, text and the like, and the user determines whether to print the document in color or black and white only.

The driver 220 receives from the printing device 100 remaining color toner or ink information through first and second communication parts (120, 209, respectively). To designate colors to objects in the document, the user can refer to the remaining color toner or ink information. As mentioned above, the remaining color toner or ink information is provided from the printing device 100, and data exchange between the printing device 100 and the data processing device 200 takes places through the second communication part 209. The designated colors at this time can be different from the colors that were originally designated to the document by the application program 211. When the color designation process is over, the printing device 100 starts the printing process. More specifically, the driver 220 performs the functions of color matching on the color-designated document, half-tone processing, and color rendering. The rendered document is transmitted to the printing device 100 through the spooler 216. Rendering can also be done before color matching. That is to say, the document in designated colors can be rendered first, color matched, and processed in half-tone. The half-tone processed document is transmitted to the printing device 100 through the spooler 216.

The printing device 100 comprises the first color residue information storage 110, and a first communication part 120. As the name implies, the printing device 100 refers to a device capable of printing documents using ink, wet toner or dry toner, for example, printers in general, and printer combos. The first color residue information storage 110 stores information about the remaining amount of colors that can be supported by the printing device. When an ink or toner cartridge is used for printing, the first color residue information storage 110 stores the information relating to the remaining color toner or ink in the ink or toner cartridge. The printing device 100 exchanges data with the data processing device 200 through the first communication part 120. Examples of the data exchanged includes remaining color toner or ink information, the documents to be printed, and on the like. The printing device 100 prints the document in designated colors under the operation of the driver 220.

Figure 3:
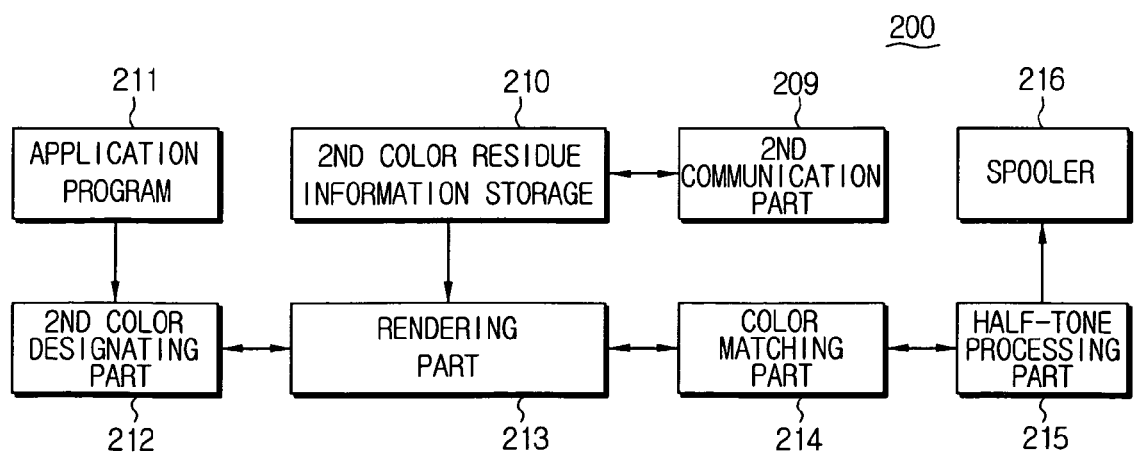
FIG. 3 illustrates an embodiment of a data processing device shown in FIG. 2.

FIG. 3 illustrates an embodiment of the data processing device shown in FIG. 2. As shown in FIG. 3, the data processing device 200' comprises includes a second communication part 209, a second color residue information storage 210, an application program 211, a second color designating part 212, a rendering part 213, a color matching part 214, a half-tone processing part 215, and a spooler 216.

The second color residue information storage 210 stores information about the remaining amount of ink or toner in the color cartridge and the black cartridge supportable by the printing device 100. The information stored in the second color residue information storage 210 is preferably identical to the remaining color toner or ink information stored in the first color residue information storage 110. This is because the remaining color toner or ink information to be stored in the first color residue information storage 110 is transmitted through both the first and the second communication part 120 and 209. The remaining color toner or ink information can be transmitted periodically, or, whenever there is any change to the information or whenever the information is requested.

Figure 4:
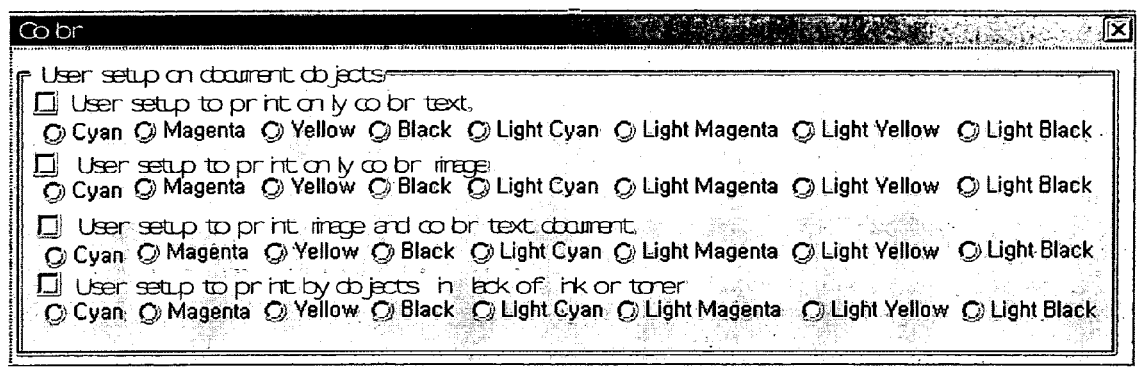
FIG. 4 is a diagram illustrating how a user designates colors to objects on a document to be printed according to an embodiment of the present invention.

The second color designating part 212 designates colors to each object on a document that is prepared through the application program 211. For example, suppose that a document is composed of text and a bit map. The second color designating part 212 designates colors for the text and the bit map, respectively. There is no fixed time when the user designates the colors to each object. In effect, it can be after rendering, at the same time with color matching, after the half-tone process, or after shingling. In the printing process involving an ink jet printer, 'shingling' refers to a data partitioning process, which is known in the art. Usually, color designation is performed on the driver. In other words, when printing a document, the second color designating part 212 does not change the colors of the objects in the document, but temporarily designates the colors at the user's choice. For instance, sometimes the second color designating part 212 designates from a color image to a black and white image or vice versa. In another case, the second color designating part 212 designates a color text to a black and white text, or to a text in another color selected by the user. Still in another case, the second color designating part 212 designates a color image and a color text to a black and white image and a black and white text, or to another color image and text conforming to the user's choice. FIG. 4 is a diagram illustrating an exemplary menu through which a user designates colors to objects on a document to be printed. The names of the colors used in FIG. 4 are for illustrative purposes only and represent the colors supported by the printing device in this example.

The rendering part 213 renders the document to be printed. The time for rendering is not fixed but variable. For example, the rendering process can be performed before or after the half-tone process, or before or after confirming the remaining amount of the colors to be used. After rendering the document, the rendering part 213 obtains characteristic information of each object in the document. Sometimes, the characteristic information of the objects indicates that remaining amount of colors the user designated is not enough to print the document. Suppose that the user designated cyan for example, but the amount of color toner or ink remaining for cyan is low. In this case, the rendering part 213 confirms whether the user wants to change the designated color (that is, cyan). Alternatively, the user is not provided with the choice of changing to a color toner or ink cartridge with an insufficient amount of toner or ink or that may otherwise be unavailable. To change the designated color, the rendering part 213 compares the color consumption of each object on the rendered document to the remaining color toner or ink information, and changes the designated color (that is, cyan) into another color that has a sufficient amount of color toner or ink remaining. However, if the user makes no change to the designated color, the printing process is ended.

The color matching part 214 matches the designated colors to the document to be printed. The half-tone processing part 215 performs the half-tone process on colors and black and white by applying a half-tone table. Data regarding the document to be printed is transmitted to the printing device 100 through the spooler 216 and the second communication part 209.

Figure 5:
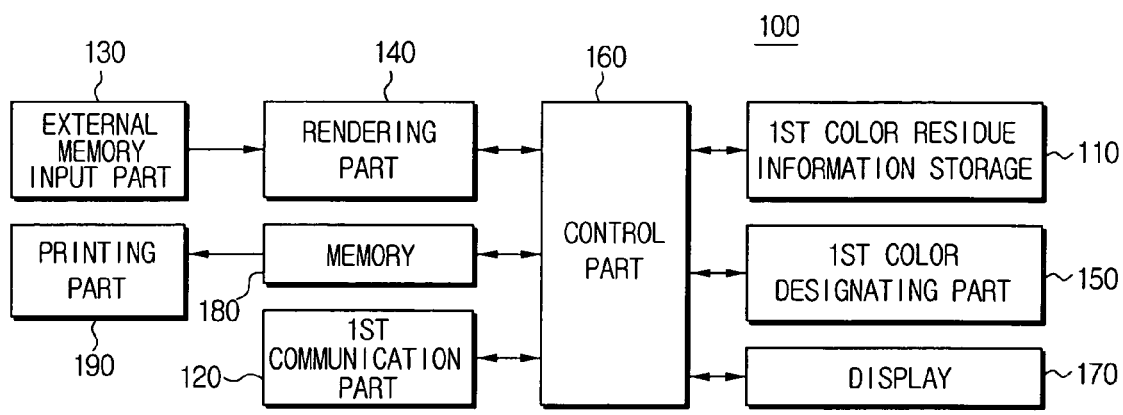
FIG. 5 illustrates an embodiment of a printing device shown in FIG. 2.

FIG. 5 illustrates an embodiment of the printing device shown in FIG. 2. As shown in FIG. 5, the printing device 100' comprises a first color residue information storage 110, a first communication part 120, an external memory input part 130, a rendering part 140, a first color designating part 150, a control part 160, a display 170, a memory 180, and a printing part 190.

Referring to FIG. 5, the following will now explain how the printing device 100 prints an input document from an external memory. As for the first color residue information storage 110, a nonvolatile random access memory (NVRAM) can be employed. The control part 160 obtains from the first color residue information storage 110 remaining color toner or ink information of a current toner or cartridge, and the display 170 displays the obtained remaining color toner or ink information. Referring to the displayed information, the first color designating part 150 designates colors to objects, respectively. An exemplary menu for designating colors to objects is illustrated in FIG. 4. Particularly, the display 170 displays a currently designated information value.

It is also possible to print a document that is stored in an external memory through the external memory input part 130. The document to be printed from external memory is input through an interface (wireless, USB, LPT, network or other suitable interface) port, and examples of the external memory include a hard disk drive (HDD), memory stick, SmartMedia, memory card and so forth. The rendering part 140 renders the document to be printed to obtain color information about each object. This object color information, specifically, the amount of the colors for printing the objects, is compared to the remaining color toner or ink information stored in the first color residue information storage 110. If it turns out that there is enough residual color for the designated color, the document is printed. Therefore, under the control of the control part 160, the printing part 190 prints the rendered data in the memory 180. If the remaining amount of required colors is not sufficient for printing the document, the user can change the designated colors.

The printing device 100 is capable of printing not only documents stored in the external memory, but also documents stored in the data processing device 100 under the control of the driver 220 (refer to FIG. 2). In the case where the printing device 100 itself prints documents, the user can designate colors to the objects in the document to be printed by means of a touch screen or by pressing a menu button. The state of the document in designated colors can be seen through a 'preview' function. If necessary, the user can edit and designate new colors to the objects. These operations, such as, displaying the designated colors and the user's color editing, can also be performed on the driver that drives the printing device. In such a case, the state of the designated colors can also be displayed through the 'preview' function, and the user is allowed to edit the colors with reference to the remaining color toner or ink information.

Figure 6:
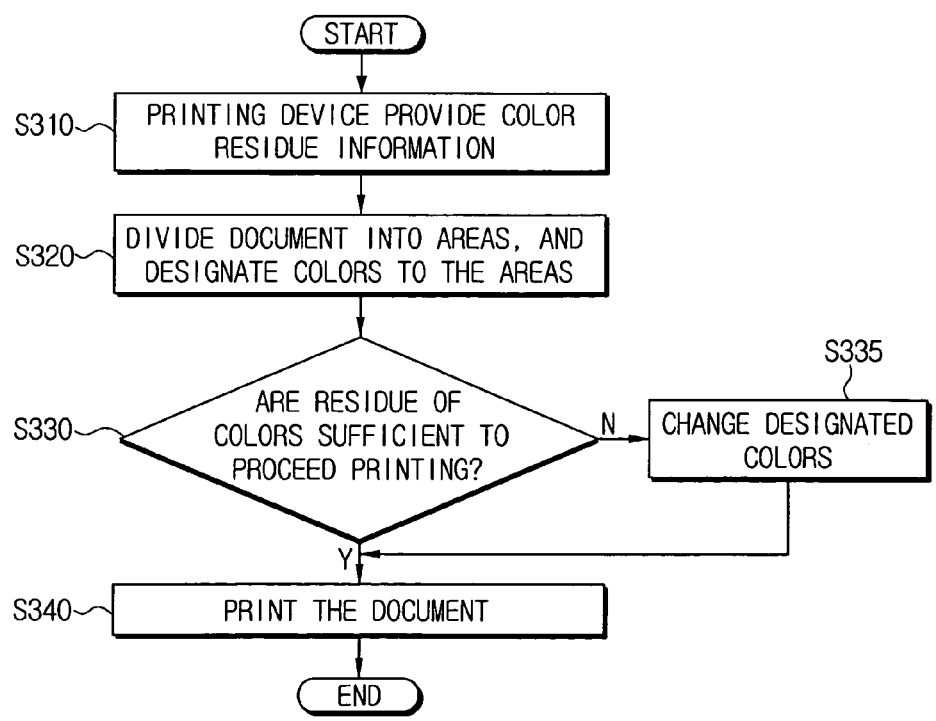
FIG. 6 is a flowchart describing a printing method according to one embodiment of the present invention.

FIG. 6 is a flowchart illustrating a printing method according to an embodiment of the present invention. The printing method will be described with reference to FIG. 2 and FIG. 6.

First, the information regarding the remaining amount of colors that can be supported by the printing device 100 is provided (S310). The remaining color toner or ink information stored in the first color residue information storage 110 is provided through the first and the second communication part 120, 209, respectively. This information can also be stored in the second color residue information storage 210. Preferably, the remaining color toner or ink information is periodically transmitted for an update, ensuring that it is identical with the information stored in the first remaining color toner or ink information storage 110.

The driver 220 segments the document to be printed into different areas, and designates colors to the segmented areas (S320). Thus, it becomes possible to modify the given colors of the objects in the document prepared through the application program 211 to other colors selected by the user. Although colors may be modified for every printing operation, it should be noted that changing colors in the document does not need to involve the application program 211. Of course, the user could designate colors to the document referring to the remaining color toner or ink information in s step S310. In the case where the data processing device 200 has control over the printing operation, the driver 220 that drives the printing device 100 designates colors. In the case where the printing device 100 is directly involved in the control and printing of documents in the external memory, the printing device 100 itself designates the colors. The remaining color toner or ink information can be referred to in advance to designate colors for the document to be printed. It is also possible to designate color(s) for one area only or at least two areas of the document. If areas of the document are segmented according to the objects existing in the document, the user is able to designate colors and/or black and white to the respective objects. After the colors have been designated, it is determined if there is a sufficient amount of the designated color remaining in the color cartridge to print the document (S330). If there is a sufficient amount of color toner or ink available for printing, the document is printed (S340). However, if there is an insufficient amount of the designated color remaining in the color cartridge, or in other words, the color is unavailable for printing, the user can change the designated color (S335). In step S335, the user can be provided with a choice of only the colors available with a sufficient amount of toner or ink to print the document or with a list of both available and unavailable colors. After the user chooses an available color, the document is printed using the newly chosen color (S340).

FIGS. 7A through 7D are flowcharts illustrating in detail how to designate colors for the document shown in FIG. 6 according to an embodiment of the present invention.

Figure 7A:
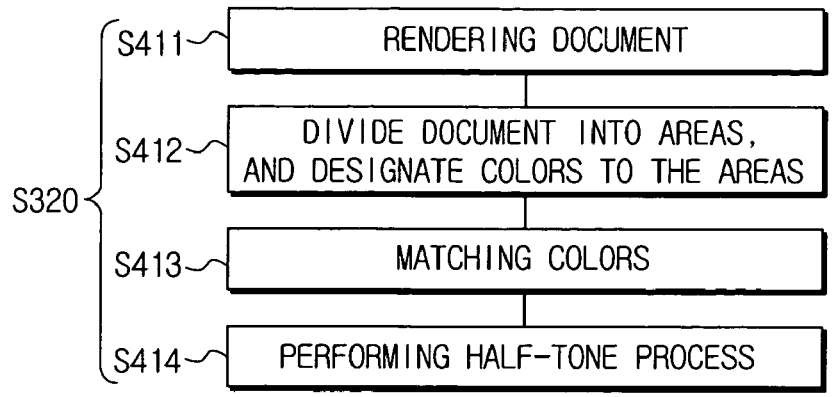
FIGS. 7A through 7D are flowcharts describing in detail how to designate colors for a document shown in FIG. 6.

The method for designating colors of the document will now be described with reference to FIG. 3 and FIG. 7A. The rendering part 213 renders the document to be printed (S411). The second color designating part 212 segments the rendered document into different areas, and designates colors to the areas (S412). The color matching part 214 matches the designated colors to the document (S413). The half-tone processing part 215 performs the half-tone process on the color matched document (S414).

Figure 7B:
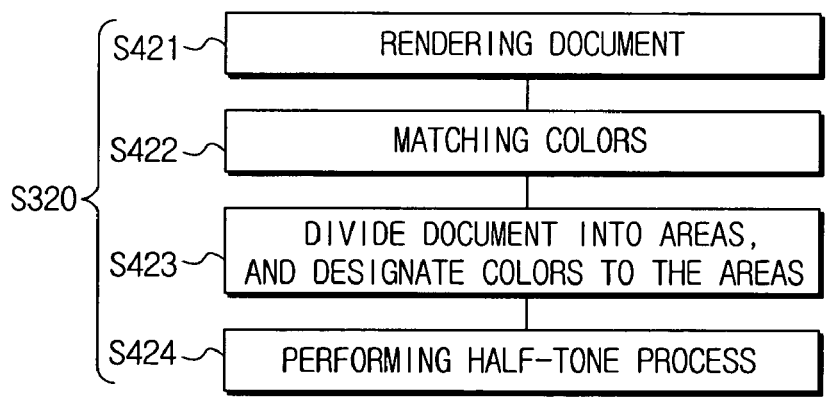

Another embodiment of the color designating method will now be described with reference to FIG. 3 and FIG. 7B. The rendering part 213 renders the document to be printed (S421). The color matching part 214 matches the designated colors to the rendered document (S422). The second color designating part 212 segments the color-matched document into different areas, and designates colors to the different areas (S423). The half-tone processing part 215 performs a half-tone process on the document in designated colors (S424).

Another embodiment of the color designating method will now be described with reference to FIG. 3 and FIG. 7C. The rendering part 213 renders the document to be printed (S431). The color matching part 214 matches the designated colors to the rendered document (S432). The half-tone processing part 215 performs a half-tone process on the color-matched document (S433). The second color designating part 212 segments the half-tone processed document into different areas, and designates colors to the areas (S434).

Yet another embodiment of the color designating method will now be described with reference to FIG. 3 and FIG. 7D.

Figure 7C:
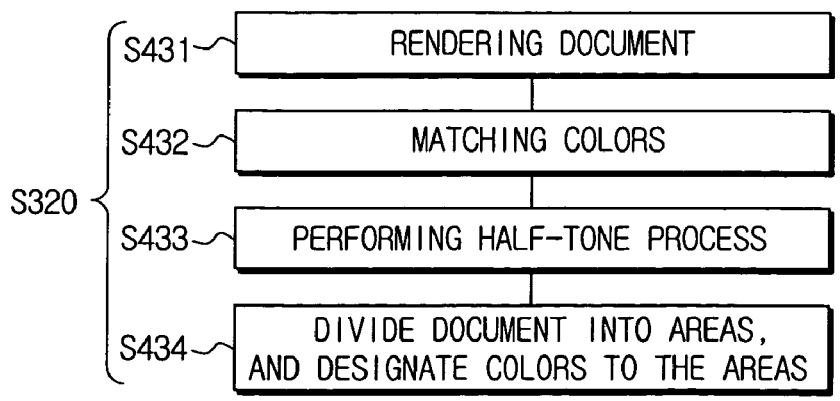
Figure 7D:
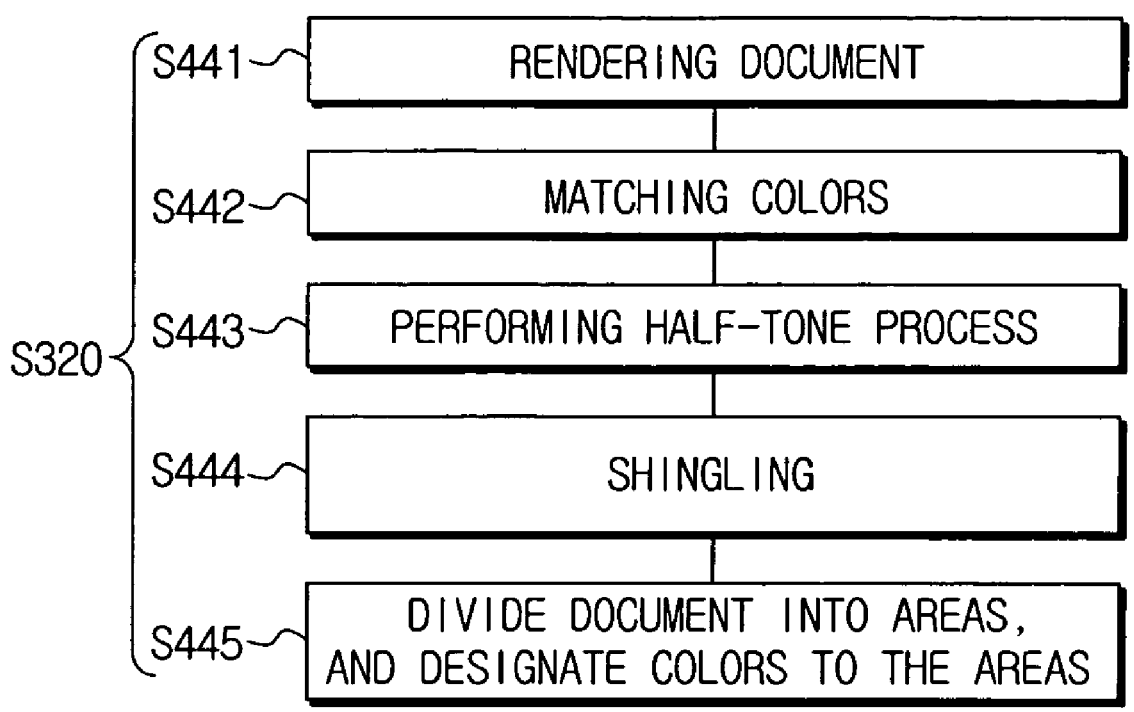

In case of using an ink jet printer, the method is similar to the embodiment illustrated in FIG. 7C. However, shingling is performed after the half-tone process (S443). Next, the second color designating part 212 segments the shingled document into different areas, and designates colors to the areas (S445).

Referring back to FIG. 6, the remaining amount of colors required for printing the document is compared to the remaining color toner or ink information, and the document is printed using the designated colors (S330 and S340). If the printing operation can be carried out using the remaining amount of the colors supported by the printing device 100, there is no need to change the designated colors (S335). The color amounts required for printing the document using the designated colors can be obtained by means of a color counter of a toner or ink cartridges mounted in the printing device 100.

Figure 8:
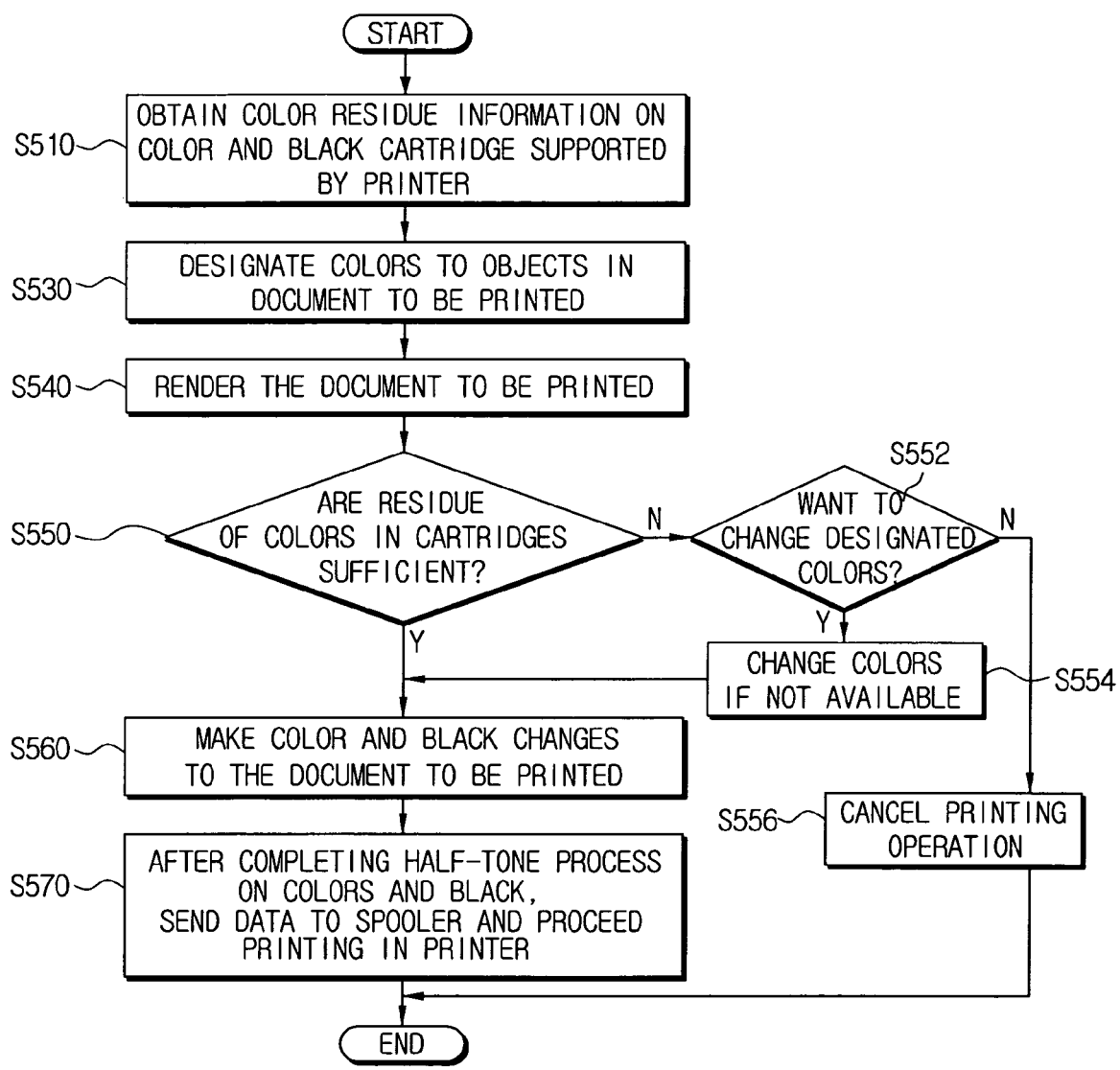
FIG. 8 is a flowchart describing a method for designating colors to each object in a document using remaining color toner or ink information and printing the document according to an embodiment of the present invention.

FIG. 8 is a flowchart illustrating a method for designating colors to each object in a document using remaining color toner or ink information and printing the document according to an embodiment of the present invention. The embodiment of the method of the present invention will be described with reference to FIG. 3 and FIG. 8.

The printing device 100 provides information about the remaining amount of colors therein (S510). For example, the remaining color toner or ink information is derived from the color and black cartridges within the printing device 100. The provided information is stored in the second color residue information storage 210. The second color designating part 212 designates colors to the document to be printed, more particularly, to the respective objects in the document (S530). For example, suppose that the document is divided into a color text and a color image. The second color designating part 212 designates colors, such as cyan for the color text and magenta for the color image. The rendering part 213 renders the document in designated colors (S540). After the document is rendered, the capacity of colors required for printing the document is compared to the remaining color toner or ink information in order to find out whether the remaining amount of colors is sufficient (S550). Therefore, in the above example, it is determined whether the remaining amounts of cyan and magenta is sufficient to proceed with the printing operation. If it turns out that the remaining amounts of the colors in question is sufficient, the color matching part 214 matches the colors to the document (S560). The half-tone processing part 215 performs the half-tone process on the color-matched document, and sends the data to the spooler 216. Lastly, the printing device 100 prints the document (S570). On the other hand, if the remaining amount of colors is low in the amount of color required for the printing operation, the user determines whether to change the designated colors (S552). Particularly, those colors whose residual amounts are not sufficient are usually changed (S554) to colors that have a sufficient residual amount of toner or ink available. For instance, when the residual amount of magenta is not sufficient, the user can change the color image that is originally designated to magenta into yellow. If there is no change made to the designated colors, the printing operation is ended (S556).

Figure 9:
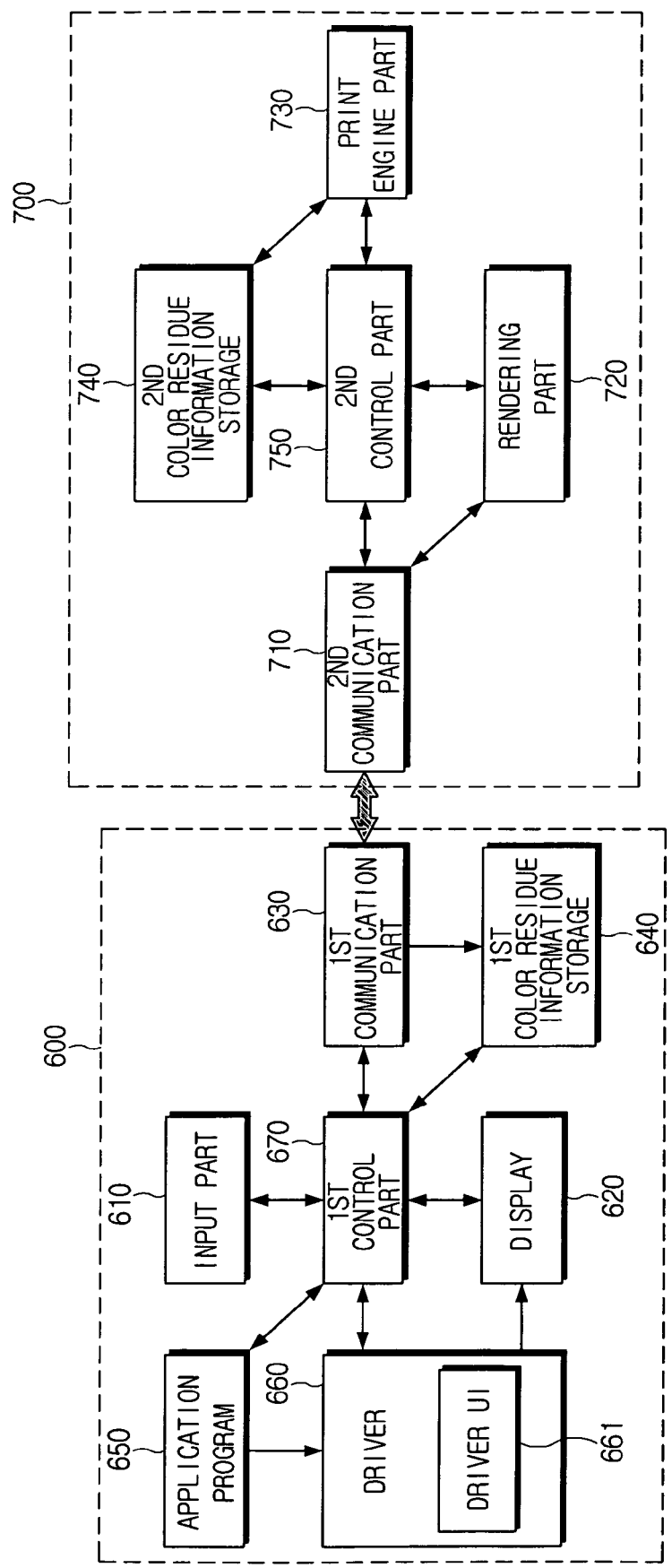
FIG. 9 illustrates a block diagram of a printing system according to an embodiment of the present invention.

FIG. 9 is a block diagram of a printing system according to an embodiment of the present invention.

The printing system according to an embodiment of the present invention comprises a data processing device 600 and a printing device 700. The data processing device 600 comprises an input part 610, a display 620, a first communication part 630, a first color residue information storage 640, an application program 650, a driver 660, and a first control part 670.

The input part 610 receives a user command for setting or selecting a function supported in the data processing device 600. Examples of the user commands include a driver UI display command, a preview function set command to see a document to be printed, a print command of a document to be printed, a color information change command and the like. When a command is input through the input part 610, the first control part 670 controls the internal components based on the input command.

The display 620 displays, under the control of the first control part 670, a driver UI 661. According to another embodiment of the present embodiment, given that the set command of the preview function, which is one of the driver's functions, is input, the first control part 670 controls the driver 660 to display the preview screen on the display 620.

The first communication part 630 enables the data processing device 600 to be connected to an external device. Examples of the first communication part 630 include a parallel port, USB port, wireless module and the like. In the present embodiment, the first communication part 630 functions as a path for printing-related data exchange between the printing device 700 and the data processing device 600. Thus, the first communication part 630 is connected to the printing device 700, and the printing-related data is transmitted and received therethrough. In particular, through the first communication part 630, a command is transmitted from the data processing device 600 to the printing device 700, and the remaining color toner or ink information is transmitted from the printing device 700 to the data processing device 600.

The first color residue information storage 640 stores remaining color toner or ink information applied to a print engine part 730, to be described later in more detail, of the printing device 700. The remaining color toner or ink information stored in the first color residue information storage 640 is identical to the remaining color toner or ink information stored in the second color residue information storage 740 of the printing device 700. This is because the remaining color toner or ink information in the second color residue information storage 740 is transmitted through both the first and the second communication part 630, 710, respectively, and stored in the corresponding storage. The remaining color toner or ink information can be transmitted periodically, or whenever there is any change made to the information, or whenever the information is requested.

The application program 650 provides an application program UI to help the user to prepare a document to be printed. The document to be printed may contain an image, text and the like, and is given diverse colors or black and white colors. When the user inputs a print command through the input part 610 to print the subject document prepared by means of the application program 650, the application program 650 transmits, under the control of the first control part 670, the document to be printed and the print command to the driver 660.

The driver 660 receives from the application program 650 the document to be printed. The driver 660 converts the document to be printed to a format that can be recognized by the printing device 700. When the user inputs the driver UI display command, the driver 660 causes, under the control of the first control part 670, the driver UI 661 to be displayed on the display 620. The user is able to change or set through the driver UI 661 the printing-related environment for the document to be printed. The printing-related environment includes the preview function. In case that the user has input the preview function set command, the document to be printed is displayed on the preview screen of the driver UI 661. Traditionally, the user could not make any change to the content of the document on the preview screen, but simply checked what the document to be printed looks like. According to another embodiment of the present embodiment, however, the user is able to change the colors of objects through the input part 610 on the preview screen. The driver 660 receives through the first and second communication parts 630 and 710 the information about the remaining amount of colors supported from the printing device 700. On the basis of the provided remaining color toner or ink information, the user is able to change colors of the respective objects shown on the preview screen. If desired, the user is also able to change the pre-designated (or original) colors of the objects in the document that has been prepared in the application program. If the user made a color change to the document shown on the preview screen to be different from the original document prepared through the application program, the driver 660 generates, based on the color change, a command for the document to be printed. Although the command is sent to the printing device 700 and converted to a bit map data by the rendering part 720 of the printing device 700 in another embodiment of the present embodiment, it is also possible that the data processing device 600 performs the rendering process, and its resulting bit map data is transmitted to the printing device 700.

The first control part 670 controls the overall operations of the data processing device 600, according to the operating system stored in an NVRAM.

Referring back to FIG. 9, the printing device 700 comprises a second communication part 710, a rendering part 720, a print engine part 730, a second color residue information storage 740, and a second control part 750. The printing device 700 for performing the printing operation comprises not only printers in general, but also printer combos.

The second communication part 710 enables the printing device 700 to be connected to an external device. Examples of the second communication part 710 include a parallel port, USB port, wireless module and the like. In the present embodiment, the second communication part 710 functions as a path for printing-related data exchange, under the control of the second control part 750, between the printing device 700 and the data processing device 600. Thus, all of the printing-related data is transmitted and received through the second communication part 710. In particular, through the second communication part 710, a command is transmitted from the data processing device 600 to the printing device 700, and the remaining color toner or ink information is transmitted from the printing device 700 to the data processing device 600.

The rendering part 720 renders, under the control of the second control part 750, the command transmitted through the first and second communication parts 630, 710, respectively, and generates a bit map data.

The print engine part 730 prints the document based on the bit map data onto a print medium, such as printing paper. In general, the print engine part 730 includes at least one ink cartridge for printing the document onto the printing paper.

The second color residue information storage 740 stores information about the residual amount of colors that can be supported from the printing device 700. The second control part 750 reads the remaining color toner or ink information out of the print engine part 730 at regular time intervals, and controls the remaining color toner or ink information being read to be stored in the second color residue information storage 740. The stored remaining color toner or ink information is periodically re-stored in the first color residue information storage 640 through the first and second communication parts 630, 710.

The second control part 750 controls, under the control program stored in the NVRAM (not shown), controls the overall operations of the printing device 700.

Figure 10:
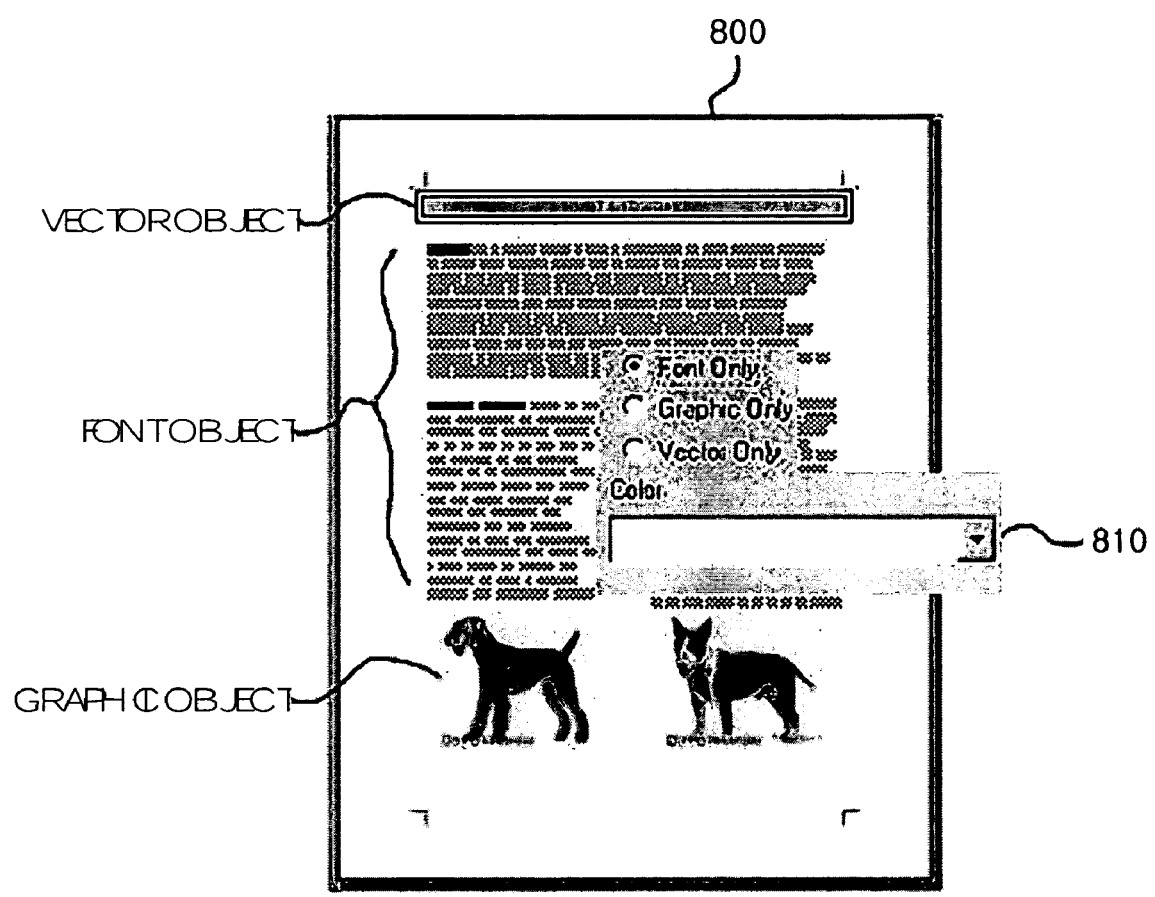
FIG. 10 illustrates a 'preview' screen of a printer driver user interface (hereinafter, it is referred to as a "UI") according to one embodiment of the present invention.

FIG. 10 illustrates an exemplary preview screen of a printer driver UI according to an embodiment of the present invention.

Referring to FIGS. 9 and 10, if the user inputs the preview function set command on the driver UI, a preview screen 800 as shown in FIG. 10 is displayed on the display 620 of the data processing device 600. The document displayed on the preview screen 800 prior to the printing can be divided into different objects, such as a vector object, a font object, and a graphic object. It is to be understood that documents do not always have the same kinds of objects. Meanwhile, the document to be printed as illustrated in FIG. 10 includes a vector object, a font object, and the graphic object, which represent the typical types of objects.

In addition, if the user inputs a color information change command through the input part 610, a color information change window for object 810 is preferably overlapped on the preview screen 800. The color information change window for object 810 allows the user to select an object he or she wants to change color, and designates a new color to the object he or she selected. Therefore, the color information change window for object 810 will comprise two selection items. An 'object selection item' allows the user to select one object from among the font object, the graphic object, and the vector object, and a 'color selection item' menu allows the user to designate a new color to the selected object. Accordingly, the user is able to select the object and the color he or she wants to change.

Preferably, the preview screen 800 may comprise a section called 'color(s) not available for printing', indicating which color(s) is not supported by the printing device 700. In effect, the 'color(s) not available for printing' section displays the information on colors that are currently not available, the information being extracted from the remaining color toner or ink information transmitted to the first color residue information storage 640 from the second color residue information storage 740. When the user inputs the preview function set command through the input part 610, the first control part 670 reads the remaining color toner or ink information out of the first color residue information storage 640, and transmits it to the driver 660. The driver 660 makes the information on color(s) not available (or not supported by the printing device) extracted from the remaining color toner or ink information displayed on the 'color(s) not available for printing' section in the preview screen 800 on the driver UI 661. In this manner, when the user wants to change colors of objects, the user knows which color(s) cannot be used, and which color(s) is available in the printing device. Alternatively, only the colors available will appear in the menu of the 'color selection item' of the color information window 810.

Figure 11:
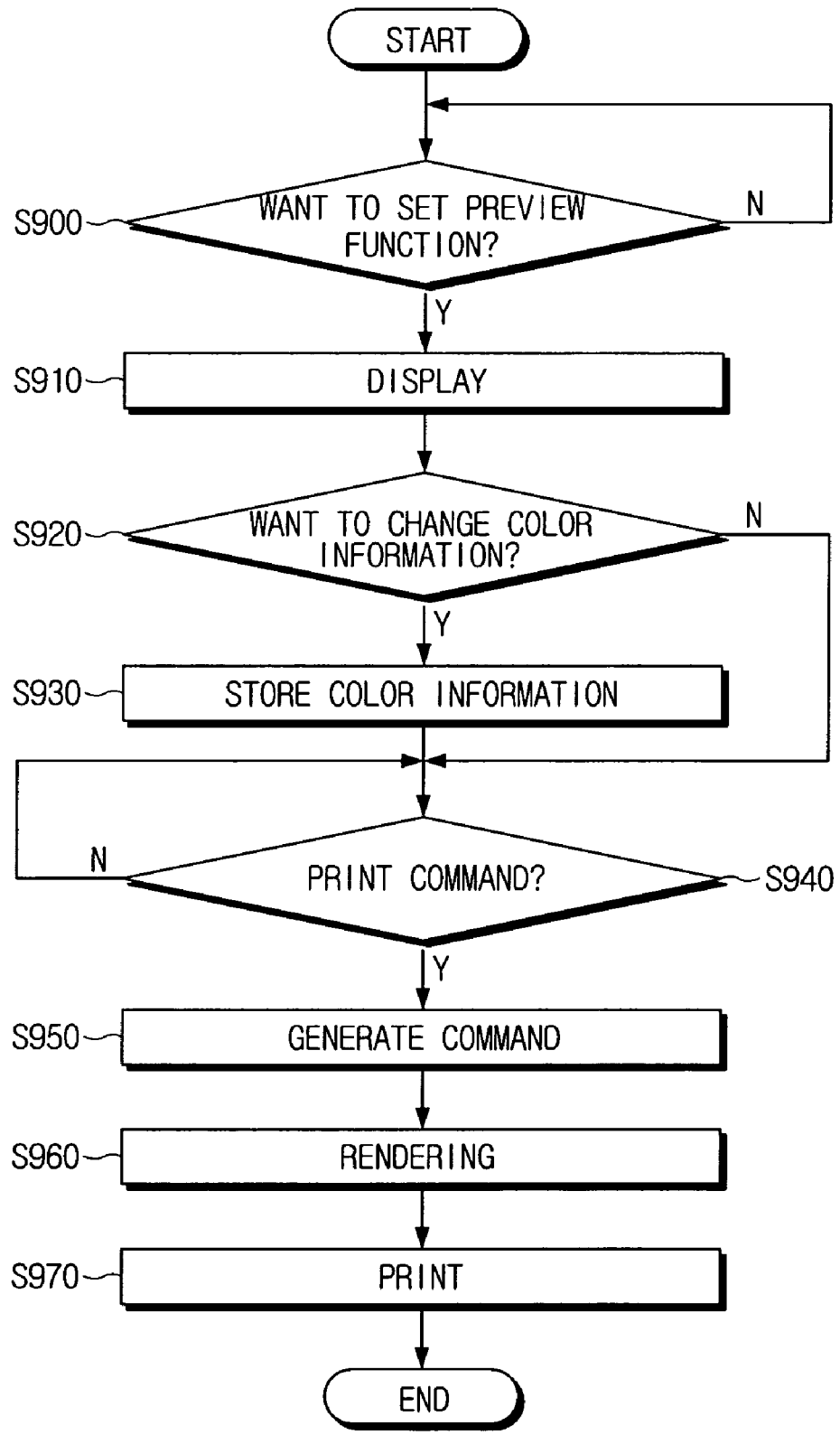
FIG. 11 is a flowchart describing a method for changing colors of objects using a preview function according to an embodiment of the present invention.

FIG. 11 is a flowchart illustrating the method for changing colors of objects with the aid of the preview function according to an embodiment of the present invention.

Referring to FIGS. 9 to 11, when the user inputs through the input part 610 the preview function set command for previewing the document to be printed (S900), the preview screen 800 shown in FIG. 10 is displayed on the display 620, under the control of the first control part 670 (S910). With the aid of the input part 610, the user selects on the preview screen 800 an object and color desired to be changed, thereby changing color information for objects (S920). At this time, the user can make the color change to the objects, referring to the 'color(s) not available for printing' section shown on the preview screen 800. The changed color information of the objects is temporarily stored in a volatile RAM (not shown) (S930).

In case that the user inputs the print command for the document to be printed (S940), the driver 660 generates a command for the document to be printed on the basis of the changed color information of the objects that is temporarily stored in the volatile RAM (not shown) (S950).

The generated command is transmitted to the printing device 700 through the first and second communication parts 630, 710, respectively, rendered under the control of the second control part 750 (S960), and printed by the print engine part 730 (S970).

As described hereto, embodiments of the present invention enable the user to be able to change the colors of every object in a document before printing.

Also, according to embodiments of the present invention, the printing device itself or the driver makes changes to the colors of the document. Thus, to change the colors of the objects in the document, the user does not need to go back to the application program where the document was originally prepared.

Since the user is informed of the residual amounts of colors available in the printing device, the user is able to change the color(s) of objects to other colors that are still sufficient and available in the cartridge. Therefore, even though part of colors in the cartridge may be insufficient for printing, the cartridge can still be used continuously, using the other available colors. By utilizing the cartridges until every color therein is consumed, the complete use of the consumable cartridges is greatly improved.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for printing a document using remaining color toner or ink information according to objects to be printed by a printing device, the method comprising the steps of:
   providing remaining color toner or ink information supported by the printing device;
   dividing the document into areas according to the objects, and then designating colors to the divided areas according to the remaining color toner or ink information; and
   printing the document in the designated colors if residual color amounts in remaining color toner or ink are sufficient to print the document in the designated colors.

2. The method according to claim 1, wherein the document printing step comprises changing the designated colors and printing the document in the changed colors if the remaining amount of colors are not sufficient to print the document in the designated colors.

3. The method according to claim 1, wherein the color designating step is performed in a driver for use in driving the printing device.

4. The method according to claim 1, wherein the color designating step comprises the steps of:
   dividing the areas of the document according to objects; and
   designating the color by using a touch screen or button of the printing device.

5. The method according to claim 1, wherein the color designating step comprises the step of designating the color of the divided areas with reference to the remaining color toner or ink information.

6. The method according to claim 1, wherein the color designating step comprises the sub-steps of:
   dividing the areas of the document into objects; and
   designating a color to each of the objects, in which the color is provided from either a color cartridge or a black cartridge.

7. The method according to claim 1, wherein the color designating step comprises the sub-steps of:
   dividing the areas of the document into a text and an image; and
   designating at least one of the text and the image in a desired color.

8. The method according to claim 1, further comprising the steps of:
   rendering the document;
   matching colors to the document in designated colors; and
   performing a half-tone process on the color matched document,
   wherein the color designating step divides the rendered document into areas and designates colors to the divided areas, and the color matching step matches the colors to the document in the designated colors.

9. The method according to claim 1, further comprising the steps of:
   rendering the document;
   matching colors to the rendered document; and
   performing a half-tone process on the color matched document,
   wherein the color designating step divides the color matched document into areas and designating colors to the divided areas, and the color matching step performs the half-tone process on the color designated document.

10. The method according to claim 1, further comprising the steps of:
    rendering the document;
    matching colors to the rendered document; and
    performing a half-tone process on the color matched document, wherein the color designating step divides the half-tone processed document into areas and designates colors to the divided areas.

11. The method according to claim 1, further comprising the steps of:
    rendering the document;
    matching colors to the rendered document;
    performing a half-tone process on the color matched document; and
    shingling the half-tone processed document, wherein the color designating step designates colors to the shingled areas.

12. A printing system comprising:
    a printing device;
    a plurality of objects to be printed by the printing device;
    an application program for preparing a document; and
    a driver for receiving remaining color toner or ink information supported by the printing device, and dividing the document into areas according to the objects and then designating colors to the areas according to the remaining color toner or ink information;
    wherein the printing device transmits the remaining color toner or ink information supported by the printer; and
    wherein the printing device is driven by the driver to print the document in the designated colors if residual color amounts in remaining color toner or ink are sufficient to print the document in the designated colors.

13. The printing system according to claim 12, wherein the driver matches the color designated document to the designated colors, performs a half-tone process on the document, and renders the half-tone processed document.

14. The printing system according to claim 12, wherein the driver renders the color designated document, matches the document to the designated colors, and performs a half-tone process on the document; and the printing device prints the half-tone processed document.

15. A method for printing a document through a device driver, the method comprising:
   changing a color information of the document to be printed by executing a preview function of the device driver;
   generating a command based on the changes made to the color information of the document;
   dividing the document into areas according to objects to be printed by a printer, and then designating colors to the divided areas according to a remaining color toner or ink information; and
   performing a printing operation based on the generated command if residual color amounts in remaining color toner or ink are sufficient to print the document in the designated colors.

16. The printing method according to claim 15, wherein the command generating step comprises the sub-steps of:
   displaying the document to be printed by executing the preview function of the device driver;
   if an object and a color on the displayed document to be printed are selected for change, storing the selected object and the color information that are subjected to the change; and
   generating a command for the document to be printed on the basis of the stored information about the object and the color to be changed.

17. The printing method according to claim 16, wherein information regarding the remaining amounts of colors supported from the printing device is displayed by means of the preview function.

* * * * *